United States Patent
Chavillon et al.

(10) Patent No.: US 11,289,732 B2
(45) Date of Patent: Mar. 29, 2022

(54) LITHIUM ELECTROCHEMICAL ACCUMULATOR OF THE LITHIUM-SULFUR TYPE COMPRISING A SPECIFIC NEGATIVE-ELECTRODE MATERIAL

(71) Applicant: COMMISSARIAT À L'ÉNERGIE ATOMIQUE ET AUX ÉNERGIES ALTERNATIVES, Paris (FR)

(72) Inventors: Benoît Chavillon, Grenoble (FR); Ronan Invernizzi, Grenoble (FR); Eric Mayousse, Grenoble (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 220 days.

(21) Appl. No.: 16/665,136

(22) Filed: Oct. 28, 2019

(65) Prior Publication Data

US 2020/0136168 A1 Apr. 30, 2020

(30) Foreign Application Priority Data

Oct. 29, 2018 (FR) ........................ 1860011

(51) Int. Cl.
*H01M 10/052* (2010.01)
*H01M 10/0565* (2010.01)
*H01M 4/134* (2010.01)
*H01M 4/1397* (2010.01)
*H01M 4/58* (2010.01)

(52) U.S. Cl.
CPC ......... *H01M 10/052* (2013.01); *H01M 4/134* (2013.01); *H01M 4/1397* (2013.01); *H01M 4/5815* (2013.01); *H01M 10/0565* (2013.01)

(58) Field of Classification Search
CPC ........................... H01M 4/134; H01M 4/5815
See application file for complete search history.

(56) References Cited

U.S. PATENT DOCUMENTS

| 3,980,495 A | 9/1976 | Roche et al. |
| 4,069,111 A | 1/1978 | Lai |
| 2012/0119158 A1 | 5/2012 | Barchasz et al. |

FOREIGN PATENT DOCUMENTS

| EP | 0569035 A1 | 11/1993 |
| FR | 2948233 A1 | 1/2011 |
| JP | 2012142101 A * | 7/2012 |

(Continued)

OTHER PUBLICATIONS

Search Report for French application No. 1860011 dated Jul. 5, 2019.

(Continued)

*Primary Examiner* — Stephan J Essex
(74) *Attorney, Agent, or Firm* — Pearne & Gordon LLP

(57) ABSTRACT

A lithium-sulfur accumulator comprising at least one electrochemical cell comprising a positive electrode comprising, as active material, at least one sulfur-containing material, a negative electrode and an electrolyte conducting lithium ions disposed between the negative electrode and the positive electrode, wherein the negative electrode comprises, as active material, a lithium and calcium alloy, wherein the calcium is present in the alloy to the extent of 2% to 34% atomic.

15 Claims, 1 Drawing Sheet

(56) References Cited

FOREIGN PATENT DOCUMENTS

JP          2012142101 A       7/2012

OTHER PUBLICATIONS

Jerabek, E.C. et al. Abstract of "Discharge Characteristics of Lithium Alloy Anodes in Lithium/Iodine Cells" In: Journal of Geophysical Research, 1979, vol. 79, No. 2, pp. 17-19.
Guidotti, R.A. et al."Thermally activated ("thermal") battery technology" In: Journal of Power Sources, Elsevier, Oct. 27, 2006, vol. 161, No. 2, pp. 1443-1449.

* cited by examiner

LITHIUM ELECTROCHEMICAL ACCUMULATOR OF THE LITHIUM-SULFUR TYPE COMPRISING A SPECIFIC NEGATIVE-ELECTRODE MATERIAL

CROSS-REFERENCE TO RELATED APPLICATIONS

This application claims priority from French Patent Application No. 18 60011 filed on Oct. 29, 2018. The content of this application is incorporated herein by reference in its entirety.

TECHNICAL FIELD

The present invention relates to a lithium electrochemical accumulator of the lithium-sulfur type comprising, in a cell, a specific negative-electrode material that has effective electrochemical properties while being able to have a thinner electrode thickness than an electrode comprising solely metallic lithium and thus having a particular advantage for power applications.

The field of the invention can be defined as that of energy storage devices, in particular that of electrochemical accumulators of the lithium-sulfur type.

PRIOR ART

Energy storage devices are conventionally electrochemical generators functioning on the principle of electrochemical cells able to deliver an electric current by means of the presence in each of them of a pair of electrodes (respectively a positive electrode and a negative electrode) separated by an electrolyte, the electrodes comprising specific materials able to react in accordance with an oxidation-reduction reaction, by means of which there is a production of electrons giving rise to the electric current and production of ions that will circulate from one electrode to the other by means of an electrolyte.

Of the accumulators meeting this principle currently the most used are as follows:

Ni-MH accumulators using metal hydride and nickel oxyhydroxide as electrode materials;

Ni—Cd accumulators using cadmium and nickel oxyhydroxide as electrode materials;

lead acid accumulators using lead and lead oxide $PbO_2$ as electrode materials; and lithium accumulators, such as lithium-ion accumulators, conventionally using, in whole or in part, lithiated materials as electrode materials.

Metallic lithium, which conventionally constitutes the active material of the negative electrode in lithium accumulators, is a material that can be used in the majority of systems since its energy per unit mass and volume is high. This is because lithium has a density of 0.534 g/cm$^3$ and an energy per unit mass of 3861 mAh/g as well as an energy density per unit volume of 2061 mAh/cm$^3$. These values remain very high compared with those obtained with other negative-electrode materials, in particular by virtue of the reaction $Li \rightarrow Li^+ + e^-$, this reaction involving the exchange of a single electron per lithium atom, which is very light, and thus generating a large quantity of energy for a low volume/mass ratio. It is therefore quite natural for lithium accumulators to have supplanted the other types of accumulator.

Currently a novel accumulator technology based on lithium is emerging as a promising alternative, this technology being lithium-sulfur technology.

The use of sulfur as the active material of a positive electrode is particularly attractive since sulfur has a very high theoretical specific capacity that may be up to 10 times greater than that obtained for conventional positive-electrode materials (around 1675 mAh·g$^{-1}$ instead of 140 mAh·g$^{-1}$ for $LiCoO_2$). What is more, sulfur is present abundantly on the planet and is characterised because of this by low costs. Finally, it is of low toxicity. All these qualities help to make it particularly attractive with a view to establishment on a large scale, in particular for electric vehicles, all the more so since lithium/sulfur accumulators could make it possible to achieve energy densities per unit mass that can range from 300 to 600 Wh·g$^{-1}$.

From a functional point of view, the reaction giving rise to the production of current (that is to say when the accumulator is in discharge mode) involves an oxidation reaction of the lithium at the negative electrode that produces electrons, which will supply the external circuit to which the positive and negative electrodes are connected, and a reduction reaction of the sulfur at the positive electrode.

Thus, explicitly, in a discharge process, the overall reaction is as follows:

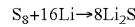

which is the sum of the reduction reaction of the sulfur at the positive electrode ($S_8 + 16e^- \rightarrow 8S^{2-}$) and the oxidation reaction of the lithium at the negative electrode ($Li \rightarrow Li^+ + e^-$).

Naturally the reverse electrochemical reactions occur during the charging process.

As is clear from the above equation, the reaction involves an exchange of 16 electrons, which testifies to the high specific capacity of the sulfur (1675 mAh·g$^{-1}$).

From a mechanistic point of view, and without being bound by the theory, in the initial state (that is to say when the accumulator is in the full-charge state), the active material, which is elementary sulfur, is present in the solid state in the positive electrode. During the reduction of the sulfur, that is to say during discharge, the cyclic sulfur molecules are reduced and form lithium polysulfides, of general formula $Li_2S_n$, with n being able to range from 1 to 8. Since the starting molecule is $S_8$, the first compounds formed are long-chain lithium polysulfides, such as $Li_2S_8$ or $Li_2S_6$. These lithium polysulfides being soluble in the organic electrolytes, the first discharge step therefore consists of the solubilisation of the active material in the electrolyte and the production of long-chain lithium polysulfides in solution. Then, as the reduction of the sulfur continues, the chain length of the polysulfides is gradually reduced and compounds such as $Li_2S_5$, $Li_2S_4$ or $Li_2S_2$ are formed in solution. Finally, the final reduction product is lithium sulfide ($Li_2S$), which for its part is insoluble in the organic electrolytes. Thus the last step of the mechanism of reduction of the sulfur consists of the precipitation of the sulfur-containing active material.

This mechanism can be correlated with the discharge profile illustrated in FIG. 1, which shows a graph illustrating the change in the potential E (in V) as a function of the capacity C (in u.a).

In this profile the first plateau can be attributed to the formation of the long chains of lithium polysulfides, whereas the second plateau corresponds to the reduction in the size of the sulfur-containing chains, until the positive electrode is passivated.

As for the metallic lithium used at the negative electrode, although having the advantages mentioned above, it may have a drawback related to the possible formation of lithium dendrites, during repeated charging processes, which may short-circuit the accumulator.

Finally, the use of lithium may present difficulties in handling for the manufacture of the negative electrodes. This is because lithium has a capacity for adhesion to all types of metal or alloy, such as stainless steel, steel or even certain fluorinated polymers. Thus it may prove difficult to handle and shape, for example by rolling or extrusion, unless particular precautions are taken, especially by working in a neutral atmosphere devoid of moisture and/or working with tools coated with a layer of non-reactive polymer, such as low-density polyethylene. Finally, for use in accumulators of the lithium-sulfur type, it may be advantageous to use, to form the negative electrode, very fine lithium strips, for example with a thickness ranging from 10 to 50 μm, with a view in particular to increasing the power density. However, such a thickness is impossible to achieve with standard rolling mills and, when such strips are available commercially, they are very expensive, even when they are already prelaminated on current collectors (for example a copper strip).

Thus, in the light of the drawbacks mentioned above, the authors of the present invention have set themselves the objective of proposing a novel type of lithium-sulfur accumulator that makes it possible to benefit from the inherent advantages in the use of lithium for forming the negative electrode while limiting the drawbacks, in particular those relating to the difficulty in handling lithium for producing thin negative electrodes.

DISCLOSURE OF THE INVENTION

Thus the invention relates to a lithium-sulfur accumulator comprising at least one electrochemical cell comprising a positive electrode comprising, as active material, at least one sulfur-containing material, a negative electrode and an electrolyte conducting lithium ions disposed between said negative electrode and said positive electrode, characterised in that the negative electrode comprises, as active material, an alloy of lithium and calcium, wherein the calcium is present in the alloy to the extent of 2% to 34% atomic and preferably in that the negative electrode consists solely of said active material.

Before going into more detail in the disclosure of the invention, the following definitions are given.

% atomic means, conventionally, above and hereinafter, the ratio corresponding to the ratio of the (total number of calcium atoms/total number of atoms of the alloy)*100.

Positive electrode means, conventionally, above and hereinafter, the electrode that serves as a cathode when the accumulator is supplying current (that is to say when it is in the process of discharging) and which serves as an anode when the accumulator is in the process of charging.

Negative electrode means, conventionally, above and hereinafter, the electrode that serves as an anode when the accumulator is supplying current (that is to say when it is in the process of discharging) and which serves as a cathode when the accumulator is in the process of charging.

Active material of the positive electrode means, conventionally, above and hereinafter, the material that is directly involved in the reduction reaction taking place at the positive electrode, this active material being a sulfur-containing active material.

Active material of the negative electrode means, conventionally, above and hereinafter, the material that is directly involved in the oxidation reaction taking place at the negative electrode, this active material being, in the context of this invention, a lithium and calcium alloy as defined above.

The negative electrode comprising such an active material can easily be prepared by rolling and have small thicknesses compatible with obtaining an improvement to the power density.

More specifically, the negative electrode may preferably consist solely of the active material, which is the lithium and calcium alloy as mentioned above.

From a structural point of view, the negative electrode is advantageously in the form of a sheet or plate having a thickness ranging from 5 to 200 μm, more specifically from 20 to 100 μm.

Advantageously, the lithium and calcium alloy forming the active material of the negative electrode is an alloy comprising solely lithium and calcium, which means that the alloy comprises calcium to the extent of 2% to 34% atomic and lithium to the extent of 66% to 98% atomic.

More specifically, it may be a lithium alloy comprising calcium to the extent of 2% to 15% atomic (which means, in other words, that, when the lithium and calcium alloy comprises solely lithium and calcium, the lithium is present in the alloy to the extent of 85% to 98% atomic).

The calcium in the lithium and calcium alloy may, wholly or partly, be in the form of $CaLi_2$. In the latter case, the lithium and calcium alloy can be considered to be a material comprising a lithium matrix wherein all or part of the calcium is in the form of $CaLi_2$ inclusions in the lithium matrix.

The authors of the present invention have been able to show that such an alloy is easily rolled and has good mechanical properties, in particular in terms of tensile strength, in particular for thicknesses as defined above. What is more, an electrode comprising such an alloy can be produced at lower manufacturing costs compared with an electrode having the same thickness of electrode made from metallic lithium.

Advantageously, the negative electrode may be self-supporting, that is to say it does not require to be placed on a support in order to be used in the accumulator of the invention and, more specifically, does not require to be placed on a current collector (which means, in other words, that the accumulator has no current collector at the negative electrode). In a variant, it can be associated with a support, for example of the current collector type, which may be a strip or a grille made from at least one electrically conductive metal element, such as copper, nickel, aluminium or stainless steel.

The positive electrode comprises, as active material, a sulfur-containing active material and optionally an electrically conductive additive and optionally an organic binder.

The sulfur-containing active material may be elementary sulfur ($S_8$), lithium disulfide ($Li_2S$) or a compound comprising at least one disulfide group —S—S—, such as a lithium polysulfide of the general formula $Li_2Sn$ (with n ranging from 2 to 8), an organic polysulfide, an organosulfur compound (such as a carbon polydisulfide) or a polymer comprising disulfide groups, the disulfide group or groups present in the organic polysulfide, the organosulfur compound or the polymer being able to be ruptured during the discharging process and reformed during the charging process.

Preferably, the sulfur-containing active material is elementary sulfur, thus conferring on the accumulator an attractive energy density through its high storage capacity per unit mass.

The electrically conductive additive may be a carbon black powder, carbon nanotubes, carbon fibres, metallic particles, conductive polymers or mixtures thereof.

As for the organic binder, this may be chosen from the following polymeric binders:

polymeric binders belonging to the category of cellulosic polymers, such as carboxymethylcellulose (known by the abbreviation CMC) or methylcellulose (known by the abbreviation MC);

polymeric binders belonging to the category of fluorinated ethylenic polymers such as polytetrafluoroethylene (known by the abbreviation PTFE), polyvinylidene fluoride (known by the abbreviation PVDF) and/or fluorinated ethylenic copolymers (such as copolymers of vinylidene fluoride and hexafluoropropylene);

polymeric binders belonging to the category of vinyl polymers, such as a polyvinyl alcohol (known by the abbreviation PVA); and mixtures thereof.

Structurally, the positive electrode may be in the form of a composite material comprising a matrix of polymeric binders, in which a sulfur-containing active material and optionally an electrically conductive additive are dispersed.

The positive electrode may be deposited on a current collector, which may be a metal material (composed of a single metallic element or an alloy of a metallic element with another element), such as copper, a copper alloy, aluminium, an aluminium alloy, nickel or stainless steel, said current collector being for example in the form of a plate or strip.

By way of example, the positive electrode may comprise elementary sulfur, an electrically conductive additive of the carbon black type, or an organic binder (for example polyvinylidene fluoride), said positive electrode being deposited on a current collector of the aluminium strip type (for example 20 µm thick).

The electrolyte conducting lithium ions may in particular be a liquid electrolyte comprising at least one organic solvent and at least one lithium salt.

The organic solvent or solvents may for example be a solvent comprising one or more ether, nitrile, sulfone and/or carbonate functions.

By way of examples of solvents comprising an ether function, mention can be made of ether solvents, such as 1,3-dioxolane (symbolised by the abbreviation DIOX), tetrahydrofuran (symbolised by the abbreviation THF), 1,2-dimethoxyethane (symbolised by the abbreviation DME), or an ether of general formula $CH_3O-[CH_2CH_2O]_n-CH_3$ (n being an integer ranging from 1 to 10), such as tetraethyleneglycol dimethylether (symbolised by the abbreviation TEGDME) and mixtures thereof.

By way of examples of solvents comprising a carbonate function, mention can be made of:

cyclic carbonate solvents, such as ethylene carbonate (symbolised by the abbreviation EC), or propylene carbonate (symbolised by the abbreviation PC);

linear carbonate solvents, such as diethyl carbonate (symbolised by the abbreviation DEC), dimethyl carbonate (symbolised by the abbreviation DMC) or ethylmethyl carbonate (symbolised by the abbreviation EMC).

Preferably, the organic solvent is an ether solvent or a mixture of ether solvents, such as a mixture of tetraethyleneglycol dimethylether and 1,3-dioxolane.

The lithium salt may be chosen from the group consisting of $LiPF_6$, $LiClO_4$, $LiBF_4$, $LiAsF_6$, LiI, $LiNO_3$, LiOH, $LiR_fSO_3$ (with $R_f$ corresponding to a perfluoroalkyl group comprising 1 to 8 carbon atoms), such as $LiCF_3SO_3$, $LiN(CF_3SO_2)_2$ (also called lithium bis[(trifluoromethyl)sulfonyl]imide corresponding to the abbreviation LiTFSI), $LiN(C_2F_5SO_2)_2$ (also called lithium bis[(perfluoroethyl)sulfonyl]imide corresponding to the abbreviation LiBETI), $LiN(SO_2F)_2$ (also called lithium bis(fluorosulfonyl)imide), $LiCH_3SO_3$, $LiB(C_2O_4)_2$ (also referred to as lithium bis(oxalato)borate or LiBOB).

The lithium salt may be present, in the electrolyte, at a concentration ranging from 0.25 M to 2 M, for example 1 M.

The electrolyte conducting lithium ions may be an aqueous liquid electrolyte (that is to say the solvent of which is water) comprising at least one lithium salt, such as those defined above, for example $LiNO_3$ and/or LiOH.

The liquid electrolyte, whether it be organic or aqueous, may further comprise one or more additives able to confer particular properties on the electrolyte (for example a passivating additive or a safety additive).

The liquid electrolyte, whether it be organic or aqueous, may, in the electrochemical cell or cells of the accumulators of the invention, be caused to impregnate a separator, which is disposed between the positive electrode and the negative electrode of the electrochemical cell.

This separator may be made from a porous material able to accommodate the liquid electrolyte in its porosity and, more specifically, a material for constituting a large reserve of electrolyte while affording good electrical separation between the positive and negative electrodes and while having a sufficiently low mass not to be detrimental to the final mass of the accumulator.

This separator may consist of a membrane made from a material chosen from glass fibres (and more specifically a non-woven fabric of glass fibres), a polymeric material such as a polyterephthalate (such as an ethylene polyterephthalate, known by the abbreviation PET), a polyolefin (for example a polyethylene or a polypropylene), a polyvinyl alcohol, a polyamide, a polytetrafluoroethylene (known by the abbreviation PTFE), a polyvinyl chloride (known by the abbreviation PVC) or a polyvinylidene fluoride (known by the abbreviation PVDF). The separator may have a thickness ranging from 5 to 300 µm.

A specific accumulator according to the invention is an accumulator comprising a cell comprising:

a negative electrode consisting of a sheet of lithium and calcium alloy comprising a calcium content of 2% to 25% atomic, said sheet having a thickness of 100 µm;

a positive electrode comprising, as active material, elementary sulfur $S_8$, as an electrically conductive additive, carbon black and as a binder polyvinylidene fluoride, the positive electrode being deposited on a current collector, for example an aluminium strip 20 µm thick; and a porous separator disposed between said negative electrode and said positive electrode, said separator being impregnated with an electrolyte comprising a lithium salt LiTFSI in a mixture of ether solvents, such as a TEGDME/DIOX mixture.

The accumulators of the invention may comprise an enclosure containing the various elements of the accumulator mentioned above, this enclosure being able to be rigid or flexible. By way of rigid examples, mention can be made of those made from stainless steel, nickel steel, aluminium or titanium.

The accumulators of the invention may furthermore be suitable for various types of format, such as the format of the button battery type, cylindrical formats, in particular the AAA, AA, C and D formats; wound or spiral formats; the prismatic format.

The accumulators of the invention may be produced by conventional techniques within the capability of a person skilled in the art, for example by stacks of various elements constituting the accumulator (namely negative electrode, positive electrode and separator), this stack being able to be held in a casing. The alloy forming the negative electrode may be produced by fusion of lithium and calcium, for example on a heated plate, at a temperature that may range from 140° to 500° C., in a neutral atmosphere (for example an argon atmosphere), followed, after mixing, by quenching of the molten mixture in order to rapidly form the alloy. The alloy thus obtained can be put in the form of a plate or sheet by rolling with a view to forming part of the negative electrode.

Other features and advantages of the invention will emerge more clearly from a reading of the additional description that follows, which relates to a precise example of implementation of the invention.

DETAILED DISCLOSURE OF A PARTICULAR EMBODIMENT

Example

The following example illustrates two lithium-sulfur accumulators according to the invention, each in the form of a button battery, comprising:

a negative electrode consisting of a disc with a diameter of 16 mm and a thickness of 100 μm and composed of a lithium and calcium alloy with calcium to the extent of 2% atomic (for the first accumulator) or calcium at 25% atomic (for the second accumulator);

a positive electrode consisting of a 16 mm diameter disc composed of a composite material comprising polyvinylidene fluoride to the extent of 10% by mass and a sulfur/carbon black mixture to the extent of 90% by mass (the sulfur representing 66% by mass of the mixture), said positive electrode being deposited on an aluminium current collector 20 μm thick;

between the negative electrode and the positive electrode, a Celgard® 2325 separator (25 μm) coupled to a nonwoven fabric of polyolefins of the Viledon® type (140 μm), the assembly forming a 16 mm diameter disc, said assembly being impregnated with an electrolyte consisting of a mixture of TEGDME/DIOX solvents in 50/50 proportions and a 1 M lithium salt LiTFSI.

By way of comparison, another lithium-sulfur accumulator not in accordance with the invention (referred to as the third accumulator) was produced in this example, this accumulator meeting the same specificities as those of the invention except that the negative electrode is made from pure lithium.

These three accumulators were subjected to cycling tests at a rating of C/20-D/20 with a capacity calculated according to the quantity of sulfur introduced into the positive electrode.

Figure 1:
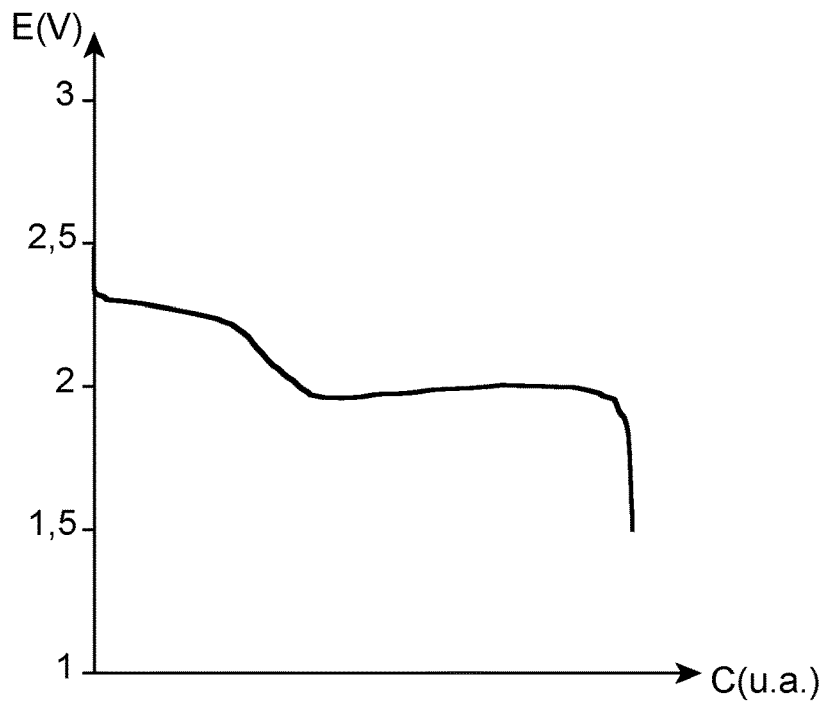
FIG. 1 is a graph illustrating the change in the potential E (in V) as a function of the capacity C (in an arbitrary unit, u.a) for a conventional lithium-sulfur accumulator.
Figure 2:
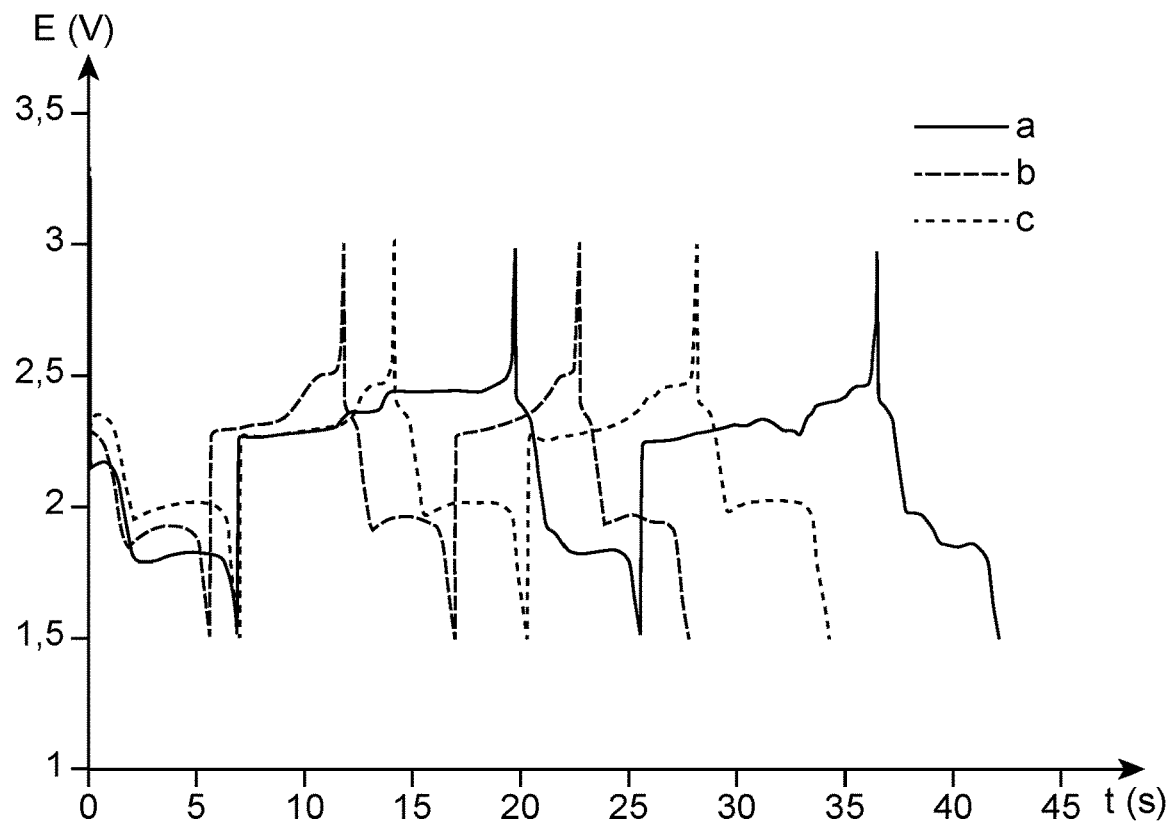
FIG. 2 is a graph illustrating the change in the potential E (in V) as a function of the time t (in s), curve a) corresponding to that obtained for the first accumulator, curve b) corresponding to that obtained for the second accumulator and curve c) corresponding to that obtained for the third accumulator of the example disclosed below.

The results are set out in FIG. 2, which illustrates the change in potential E (in V) as a function of time t (in s), curve a) corresponding to that obtained for the first accumulator, curve b) corresponding to that obtained for the second accumulator and curve c) corresponding to that obtained for the third accumulator.

These three curves have a trend characteristic of a lithium-sulfur accumulator in a charging-discharging system, each having two discharging and charging levels. The duration of discharge for the accumulators according to the invention is 6 to 8 hours, which attests to the possibility of effectively using a lithium and calcium alloy for forming negative electrodes.

Furthermore, the presence of calcium in the lithium alloy constituting the negative electrode helps to make the alloy easier to roll than pure lithium, which makes it possible to envisage the use of such an alloy for forming thinner negative electrodes and thus larger developed surfaces, which may prove a major asset in accumulators intended for power applications.

The invention claimed is:

1. A lithium-sulfur accumulator comprising at least one electrochemical cell comprising a positive electrode comprising, as active material, at least one sulfur-containing material, a negative electrode and an electrolyte conducting lithium ions disposed between said negative electrode and said positive electrode, characterised in that the negative electrode consists solely of an active material, which is a lithium and calcium alloy, wherein the calcium is present in the alloy to the extent of 2% to 34% atomic.

2. The lithium-sulfur accumulator according to claim 1, wherein the negative electrode is in the form of a sheet or plate having a thickness ranging from 5 to 200 μm.

3. The lithium-sulfur accumulator according to claim 1, wherein the lithium and calcium alloy comprises solely lithium and calcium.

4. The lithium-sulfur accumulator according to claim 1, wherein the lithium and calcium alloy is a lithium alloy comprising calcium to the extent of 2% to 15% atomic.

5. The lithium-sulfur accumulator according to claim 1, wherein the calcium in the lithium and calcium alloy is wholly or partly in the form of $CaLi_2$.

6. The lithium-sulfur accumulator according to claim 1, wherein the negative electrode is self-supporting.

7. The lithium-sulfur accumulator according to claim 1, wherein the sulfur-containing active material is elementary sulfur ($S_8$), lithium disulfide ($Li_2S$) or a compound comprising at least one disulfide group —S—S—.

8. The lithium-sulfur accumulator according to claim 1, wherein the sulfur-containing active material is elementary sulfur.

9. The lithium-sulfur accumulator according to claim 1, wherein the positive electrode further comprises an electrically conductive additive and optionally an organic binder.

10. The lithium-sulfur accumulator according to claim 9, wherein the electrically conductive additive is a carbon black powder, carbon nanotubes, carbon fibres, metal particles, conductive polymers or mixtures thereof.

11. The lithium-sulfur accumulator according to claim 9, wherein the organic binder is a polymeric binder.

12. The lithium-sulfur accumulator according to claim 1, wherein the electrolyte conducting lithium ions is a liquid electrolyte comprising at least one organic solvent and at least one lithium salt.

13. The lithium-sulfur accumulator according to claim 12, wherein the organic solvent or solvents are chosen from solvents comprising one or more ether, nitrile, sulfone and/or carbonate functions.

14. Lithium-sulfur accumulator according to claim 12, wherein the organic solvent is an ether solvent or a mixture of ether solvents.

15. The lithium-sulfur accumulator according to claim 12, wherein the lithium salt is chosen from the group consisting of $LiPF_6$, $LiClO_4$, $LiBF_4$, $LiAsF_6$, $LiI$, $LiNO_3$, $LiOH$, $LiRfSO_3$, with $R_f$ corresponding to a perfluoroalkyl group comprising 1 to 8 carbon atoms, $LiN(CF_3SO_2)_2$, $LiN(C_2F_5SO_2)_2$, $LiN(SO_2F)_2$, $LiCH_3SO_3$ or $LiB(C_2O_4)_2$.

* * * * *